US009240205B1

(12) United States Patent
Gao et al.

(10) Patent No.: US 9,240,205 B1
(45) Date of Patent: Jan. 19, 2016

(54) WRITE PARAMETERS USED TO ENSURE ACCURATE PHASE LOCK DURING READING OF A HEAT-ASSISTED MAGNETIC RECORDING MEDIUM

(71) Applicant: Seagate Technology LLC, Cupertino, CA (US)

(72) Inventors: Kaizhong Gao, North Oaks, MN (US); Pu-Ling Lu, Rosemount, MN (US); Edward Charles Gage, Lakeville, MN (US); Wenzhong Zhu, Apple Valley, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/624,100

(22) Filed: Feb. 17, 2015

(51) Int. Cl.
*G11B 11/00* (2006.01)
*G11B 7/1263* (2012.01)
*G11B 5/48* (2006.01)
*G11B 5/60* (2006.01)
G11B 5/31 (2006.01)
G11B 5/00 (2006.01)

(52) U.S. Cl.
CPC ............ *G11B 7/1263* (2013.01); *G11B 5/4866* (2013.01); *G11B 5/6088* (2013.01); *G11B 5/3133* (2013.01); *G11B 2005/0021* (2013.01)

(58) Field of Classification Search
CPC .................... G11B 5/4866; G11B 2005/0021; G11B 5/314; G11B 5/6088; G11B 2005/001; G11B 11/10554; G11B 7/1206; G11B 7/1263; G11B 5/3133
USPC ........... 369/13.33, 13.32, 31.24, 13.13, 13.01
See application file for complete search history.

(56) References Cited

U.S. PATENT DOCUMENTS

| 7,663,840 | B2 * | 2/2010 | Mallary | G11B 5/855 360/131 |
|---|---|---|---|---|
| 7,995,425 | B2 | 8/2011 | Schreck et al. | |
| 8,456,643 | B2 | 6/2013 | Prabhakaran et al. | |
| 8,456,980 | B1 | 6/2013 | Thayamballi | |
| 8,593,915 | B2 | 11/2013 | Schreck et al. | |
| 8,873,353 | B1 * | 10/2014 | Riddering | G11B 5/314 369/13.33 |
| 9,070,377 | B1 * | 6/2015 | Dakroub | G11B 7/1263 |

\* cited by examiner

*Primary Examiner* — Ali Neyzari
(74) *Attorney, Agent, or Firm* — Hollingsworth Davis, LLC (57) ABSTRACT

Based on thermal time constant of a head-to-media spacing of a write head, a write parameter is determined that includes at least one of: a modified laser power boost used at a beginning of writing; and a time adjustment affecting the beginning of the writing. The write parameter is applied to writing operations affecting a heat-assisted magnetic recording medium, the write parameter ensuring accurate phase lock during reading of the heat-assisted magnetic recording medium.

20 Claims, 7 Drawing Sheets

WRITE PARAMETERS USED TO ENSURE ACCURATE PHASE LOCK DURING READING OF A HEAT-ASSISTED MAGNETIC RECORDING MEDIUM

SUMMARY

The present disclosure is directed to write parameters used to ensure accurate phase lock during reading operations of a recording medium. In one embodiment, based on a thermal time constant of a head-to-media spacing of a write head, a write parameter is determined that includes at least one of: a modified laser power boost used at a beginning of writing; and a time adjustment affecting the beginning of the writing. The write parameter is applied to writing operations affecting a heat-assisted magnetic recording medium, the write parameter ensuring accurate phase lock during reading of the heat-assisted magnetic recording medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to synchronizing read/write operations in data storage devices that use magnetic data storage media, such as hard disk drives (HDDs). A hard disk drive may use servo marks (sometimes referred to as servo sectors) that are written on the media surfaces during manufacture. The servo marks are written at positions along each data track and include data that allow a read/write head to locate its position. Data sectors store the user data and are written between the servo marks. The data sectors are written at a known time delay from the end of the servo mark. Subsequent read operations rely on this time delay to synchronize with the beginning of the data sector.

The synchronization of data sectors becomes more challenging in devices that use heat-assisted magnetic recording (HAMR). This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

A laser or similar device may be directly (e.g., surface-attached) or indirectly (e.g., via optical fiber) coupled to a HAMR read/write head. Due to optical losses in the coupling path between the laser and the medium, the read/write head may see a marked increase in temperature at certain regions of the read/write while writing. There may be other sources of heat in the read/write head, such as a write coil used for generating a magnetic field used in the writing, and heaters used for fine control of head-to-media spacing (HMS). The heaters cause a local protrusion due to thermal expansion of the material, and the protrusion can be finely controlled to maintain a desired clearance between read/write transducers and the recording medium.

The introduction of a HAMR energy source to the read/write head can complicate the control of HMS, which in turn can complicate the synchronization of data sectors. For example, when beginning a write operation, the data at the beginning of the data sector may be more prone to error if the read/write head was not close to thermal equilibrium when writing began. This can lead to a shift in the position of the preamble transitions and the data sector, and lead to an increase in bit-error rate (BER) and a decrease in signal to noise ratio (SNR).

In embodiments described below, a time constant of a head-to-media spacing of a write head in response to laser output power may be estimated. This estimation may be applicable to a particular class of device (e.g., different combination of laser and slider body part numbers) or for each individual device, e.g., set during qualification testing. This time constant may be directly or indirectly used to results in determine a write parameter used during writing operations to a heat-assisted magnetic recording medium. The write parameter ensures accurate phase lock during the read operations, and therefore helps ensure data can be read back reliably. The write parameter may include a start time and/or magnitude of a laser power boost at the beginning of writing a preamplifier timing shift. Either or both of these can be adjusted as needed for a particular device or class of devices.

Figure 1:
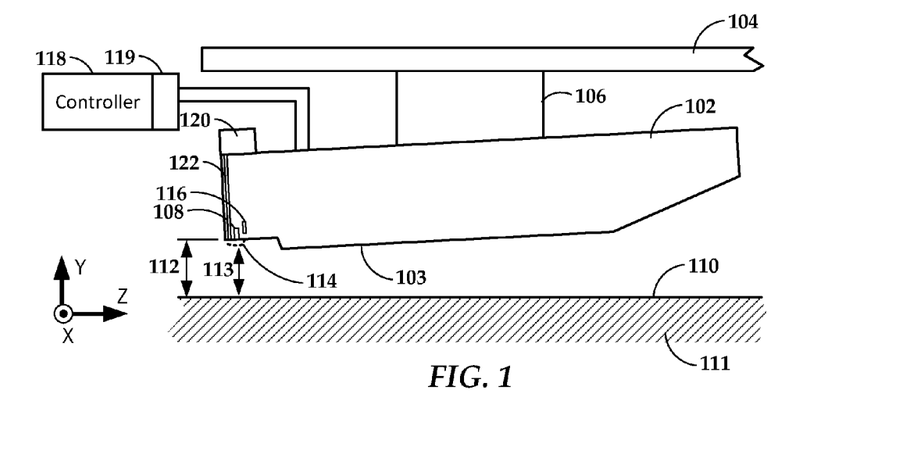
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., hard disk drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

Region 114 is a "close point" of the read/write head 102, which is generally understood to be the closest point of contact between the read/write transducers 108 and the magnetic recording medium 111, and generally defines the head-to-media spacing (HMS) 113. To account for both static and dynamic variations that may affect slider flying height 112, the read/write head 102 may be configured such that a region 114 of the read/write head 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

To provide this type of control over effective head-to-media spacing 113 via heat, the read/write head 102 may include (or otherwise be thermally coupled to) one or more heating elements 116. These heating elements 116 (e.g., resistance heaters) may be provided with selectable amounts of current by a controller 118. Generally, the controller 118 at least includes logic circuitry for controlling the functions of an apparatus that includes at least the read/write head 102 and recording medium 111. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the read/write head 102 and other components not shown.

Other elements of the read/write head 102 may also provide heat besides or in addition to the heating element 116. For example, a write coil of the read/write transducers 108 may generate sufficient heat to cause configurable deformation of region 114. This deformation will only occur when the write coil is energized, e.g., when data is being written. Further, the illustrated read/write head 102 is configured as a HAMR device, which includes additional components that generate heat near the read/write transducer 108. These components include laser 120 (or other energy source) and waveguide 122. The waveguide 122 delivers light from the laser 120 to components near the read/write transducers 108. These components are shown in greater detail in FIG. 2.

Figure 2:
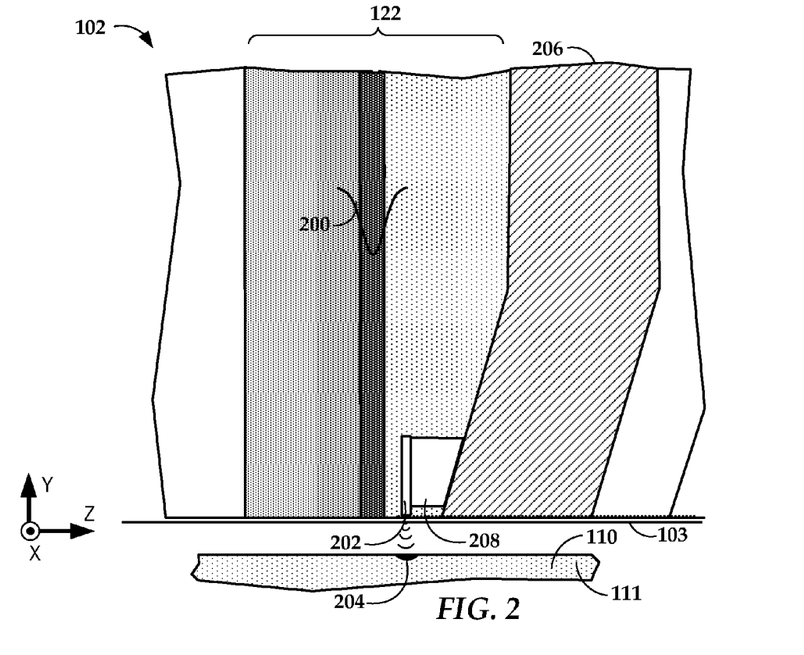
FIG. 2 is a cross-sectional view of a read/write head according to an example embodiment.

In FIG. 2, a block diagram illustrates a cross-sectional view of the read/write head 102 according to an example embodiment. The waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be quite significant, leading to local protrusion in the region of the write pole 206 and near-field transducer 202.

Generally, because a HAMR read/write head has an additional heat generating component, this may complicate setting HMS during writing. Also, HAMR may be designed to use small clearances to achieve the desired optical coupling efficiency and temperature of the hot spot, and so may be more sensitive to variations of HMS than conventional read/write heads. Generally, the read/write head will require a certain amount of time after being activated for writing until thermal equilibrium is reached and HMS has stabilized enough to write data reliably. One technique used to decrease the time needed for a HAMR read/write heat to come into thermal equilibrium is to boost the laser power at the start of writing. This is shown by way of illustration in the graph of FIG. 3.

Figure 3:
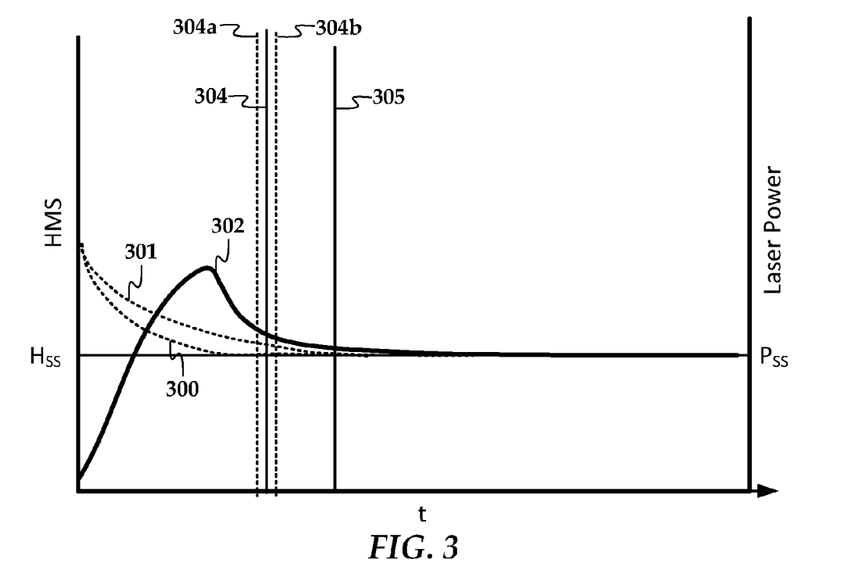
FIG. 3 is a graph of laser power boost and head-media spacing of an apparatus according to an example embodiment.

The graph of FIG. 3 shows an overlay of HMS over time (the dashed curves 300 and 301) and laser power over the same time (solid curve 302) at the beginning of a write operation. The laser power curve 302 shows a boost of the laser power (e.g., current increase) at the beginning of the write cycle, which results in the HMS coming into thermal equilibrium (as indicated by curve 300) faster than if no boost was applied (as indicated by curve 301). Thus the boosting of laser power allows the write head to write data at time 304 as opposed to time 305. After the boost, the laser power is brought down to a steady state value $P_{SS}$, and the HMS settles to a steady state value $H_{SS}$.

The difference in times 304 and 305 can affect the areal density of the media. Generally, the sooner the HMS comes into equilibrium, the sooner the read/write head can reliably write data after the servo marks. However, even with equivalent parts, the thermal equilibrium time can be unpredictable, as indicated by dashed lines 304a-b. Different laser diodes can have different time responses when current is applied at the start of writing. Additional components of the read/write head (e.g., write coil, NFT) may also have some variability in thermal equilibrium time, which increases variability when combined with the laser. As will be described below, this can be manifested as a variation in bit transition locations, which can cause difficulties when reading back preambles.

The media may be arranged with a preamble positioned before a data sector. The read/write head may energize the write coil to write a predetermined pattern while over the preamble while still coming into thermal equilibrium. The information written in preamble region is not user data, but is used during read operations in order to set the timing clock. The preamble information tells where the user data starts (location and phase). The starting point and phase of the first bits in the preamble may not matter as much as ensuring that the bit transitions are relatively constant along the preamble. A shift such as indicated by lines 304a-b can cause unpredictability in reading back at least part of the preamble. For example, if the write head is not fully in equilibrium when writing the preamble, the bit transitions within the preamble sequence may shift in down track direction. As a result, the reader may have a hard time synchronizing clock, which is used to determine exactly where the user data starts. One way to compensate for this shift is to use a longer preamble. However, longer preambles use more media space, leading to lower drive capacities.

There are a number of variables that may affect whether a particular write head is ready for writing. Factors such as laser rise time, laser induced write protrusion, heater and write coil thermal response, nominal fly height and HMS, preamplifier characteristics, media characteristics, etc., may cause differences in total write head response, even between write heads and/or preamplifiers of the same design. This can be further exacerbated when generally equivalent parts (e.g., laser diodes) from different vendors and/or made by a different process are used. As such, in order to account for these variables, preamble sizes may be set larger than necessary in all cases to provide a factor of safety in the final product.

As described below, instead of using larger preambles, preamble writing timing windows can be adjusted. Variables in particular preamplifier, head, and media combination can affect a location where write transitions begin, and the locations ultimately affect phase lock when reading back the written data. These characteristics may include protrusion, laser rise time, thermal changes in slider, optical path, laser, etc. In recognition of these variables, a deterministic phase shift at the beginning of writing can be found and remedial actions taken to compensate. The remedial action may include changing a timing of magnetic write transitions (e.g., phase-lock loop pre-compensation) and/or creating a custom laser current profile.

The variables that affect this phase shift can be estimated before integration of the device, however there may still be some compensation needed for individual storage devices. For example, individual part performance can be measured off line, e.g., before the parts get to factory. This can provide a rough time scale of the head response, and a base set of write parameters (e.g., laser, heater, and writer currents) can be defined that achieves this response. The preamp can include multiple settings to control laser power, heater power and writer power around these base parameters. In addition, the written in timing window can be adjusted the preamble is written. This can compensate for the transition shift, and ensure the preamble transition bits are written consistently.

Figure 4:
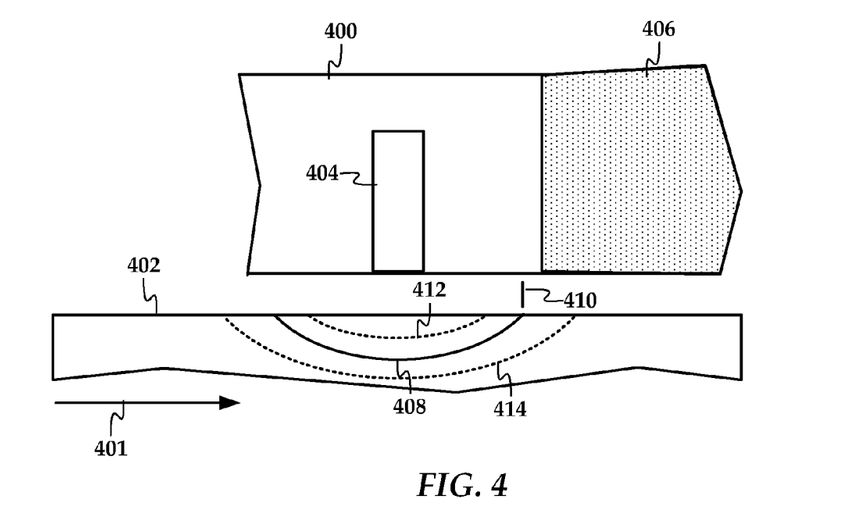
FIG. 4 is a block diagram illustrating a transition position/location according to an example embodiment.

In FIG. 4, a block diagram illustrates an example of how these factors can affect phase lock during reading back of data. A read/write head 400 is shown proximate a recording medium 402. The medium 402 moves relative to the read/write head 400 as indicated by the arrow 401. An NFT 404 creates a hotspot 408 the medium 402 while a write pole 406 applies a magnetic field to the medium 402. An edge of the hotspot defines a transition position 410 that may be defined relative to the NFT 404 and/or the write pole 406.

Generally, the transition position 410 represents a boundary where the magnetic field can reliably write data to the medium due to the hotspot 408 lowering magnetic coercivity sufficiently. As noted above, dynamic thermal conditions can affect HMS and laser power at the beginning of writing, which in turn can affect the size of the hotspot 408. As indicated by dashed lines 412, 414, variations in the size of the hotspot can cause changes in the transition position 410, and thereby affect where the boundaries between bits are written to the medium 402.

Figure 5:
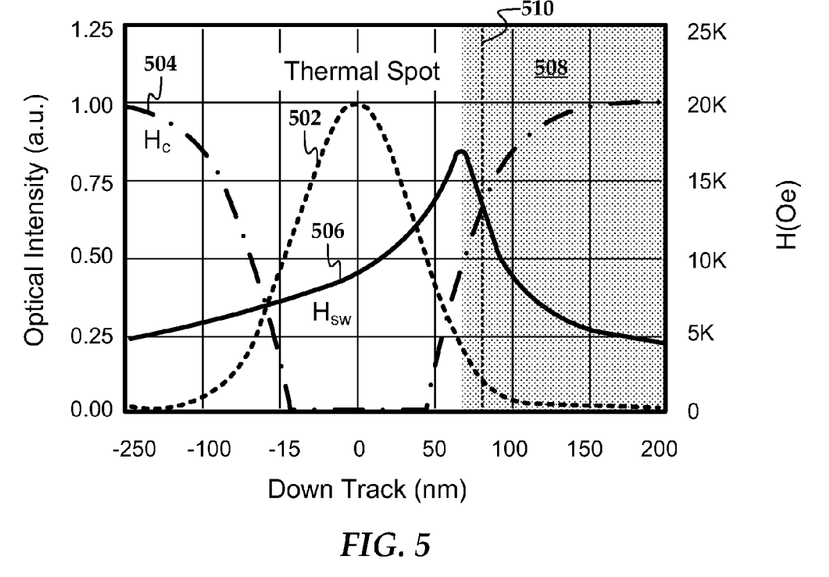
FIG. 5 is a graph illustrating factors affecting transition position/location of a read/write head according to an example embodiment.

In FIG. 5, a graph illustrates how various factors can affect transition position in a read/write head according to an example embodiment. Curve 502 represents optical intensity of the hot spot applied to the recording medium, and is centered in the downtrack direction around the center of the NFT, which in this graph used the reference point where down track location is zero. Curve 504 represents the coercivity $H_C$ of the recording medium aligned with the read/write head, such that coercivity is minimum directly below the NFT. Curve 50 represents the strength of the magnetic field $H_{SW}$ generated by the write pole, the location of the write pole being indicated by shaded area 508. Line 510 indicates the transition location, which is a boundary along which $H_C$=Hsw, and defines where the transitions of bits will be written on the recording medium relative to the NFT location on the read/write head. A change thermal or electrical characteristics that alters, e.g., the size or shape thermal hot spot curve, can shift where bit boundaries are written relative to the servo marks on the medium.

A change in bit boundaries in writing bits can accordingly result in variation in timing, e.g., relative to prewritten servo marks, when reading back the bit boundaries. This is further illustrated in the block diagram of FIG. 6, which illustrates a portion of a track 600 being written to a recording medium. Vertical lines 602-606 represent where a reader, based on servo timing, expects bit transitions to be located. Regions 610-612 represent an approximation of actual written bit sizes that may vary due to factors such as variation in HMS and laser power. While the regions 610-612 are circular, the actual shapes of the bits written, e.g., as defined by the shape of the hotspot, may be non-circular. The size of the bits in the downtrack direction (left and right in this diagram, and represented by distances between adjacent transition locations 602-606) can be controlled by timing of the write coil transitions. However, even though the regions 610-612 are roughly centered between expected bit transition locations 603 and 604, the start of the first bit transition (and possibly subsequent transitions) may be too early if the hotspot is larger than expected, as represented by offset 614 for region 612. Similarly, the start of the first transition may be too late of the hotspot is smaller than expected, as indicated by offset 616 for region 612. A variation in the hotspot size over time can also affect timing, and statistical variation in the hotspot size over time can add to jitter.

Figure 6:
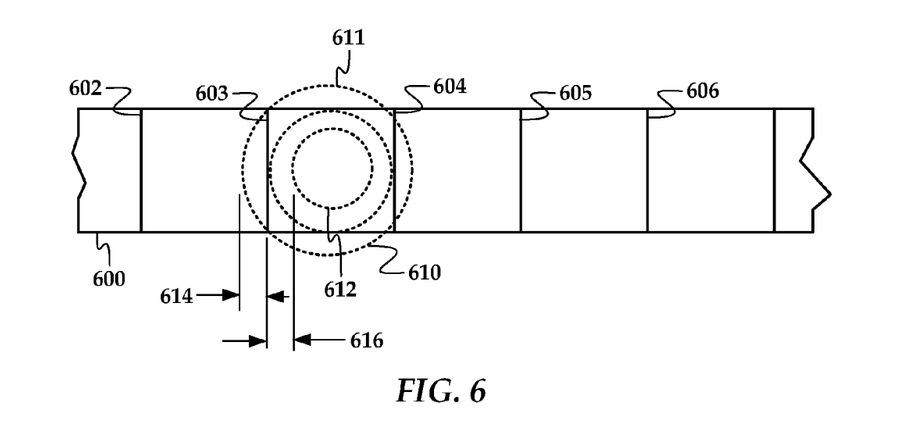
FIG. 6 is a block diagram illustrating effects that variations in transition position/location have on bit transitions according to an example embodiment.

As FIG. 6 demonstrates, the crosstrack dimension (vertical dimension in FIG. 6) of the written bits can affect timing of the bit patterns written to preambles and data sectors of the recording medium. As such, by taking into account thermal equilibrium at the beginning of writing data, a more consistent and accurate location of bit transitions can be achieved, thereby reducing bit errors and/or non-convergence. This can be done by first setting laser power and HMS such that cross track bit width is at or close to a desired dimension, and then further adjusting a start time of writing, e.g., adjusting phase of signals applied to a magnetic writer, adjusting a magnitude and/or timing of a boost current applied to the laser.

Figure 7:
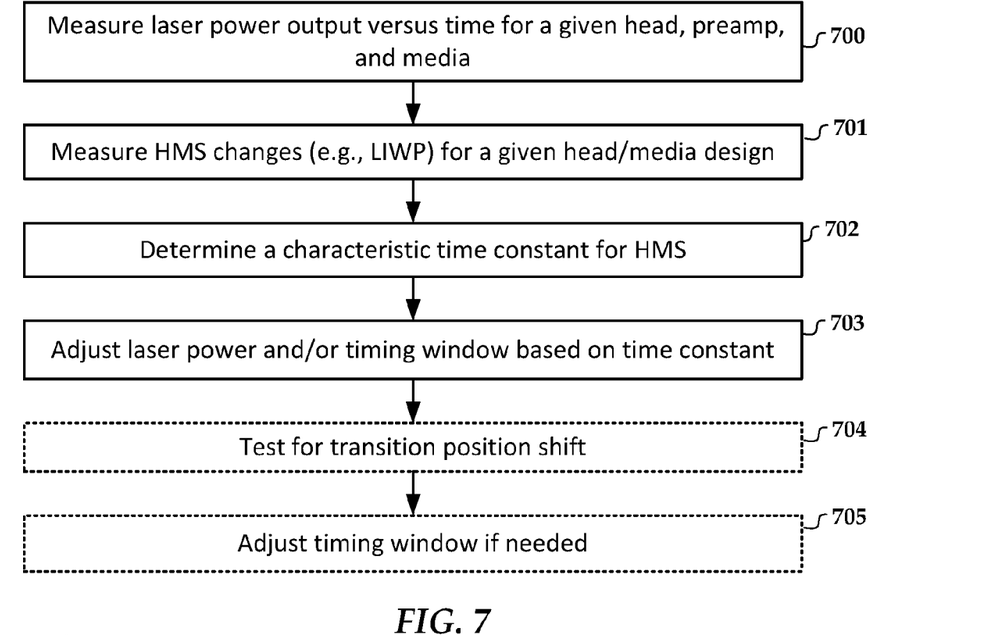
FIG. 7 is a flowchart illustrating a procedure according to an example embodiment.

In FIG. 7, a flowchart illustrates a method of setting laser power and write timing to ensure successful synchronization of data sectors when reading back the written data. The method involves measuring 700 laser power versus time. This may involve offline measurement of the laser power (e.g., tracking current and/or voltage values) and/or direct measurement of optical power via a photodiode or the like to determine laser-specific characteristics such as rise time and impedance. These measurements may be made using prototype drives and/or in shipping drives, e.g., performed before or as part of qualification testing. In the latter case, in-drive sensors such as head-mounted temperature sensors and photodiodes can be used to determine the respective HMS and laser power values.

An HMS change for a given read/write head is also measured 701 for a given head/media design. The HMS change may be caused by laser-induced write protrusion (LIWP) and can affect both magnitude of HMS as well as timing, e.g., time to come into thermal equilibrium. These laser and HMS measurements can be used to determine 702 a characteristic time constant for HMS change and laser output. Generally, this time constant reflects a baseline transition location that may be affected by variances in the thermal spot size. In response to this characteristic time constant, adjustments 703 may be made to the laser boost power and/or timing window (e.g., preamp delay before sending bit transition signals to write coil), or any other write parameter of interest.

The adjustments 703 may be done iteratively. For example, general characteristics measured or estimated at 701 and 702 may provide starting point from which to iterate through the different parameters to converge on an optimum or acceptable performance. Generally, these adjustments may also result in the data being written at the target track width, as indicated by regions 610-612 in FIG. 6. In other cases, it may be desirable to write to slightly smaller crosstrack width, e.g., by decreasing laser boost power, and then pre-adjusting a timing window for writing the preamble accordingly.

In some situations, the preamble may be increased or decreased based on respectively smaller or larger time constants that affect HMS spacing. This may occur, for example, when it takes a particular head/media combination longer than normal to come into thermal equilibrium at the start of writing. For example, a default preamble of 3 T may be used as a starting point for a particular class of device, and this can be adjusted up to 4 T or more, or adjusted downwards to 2 T depending on the time constant.

After the laser power and/or timing window are adjusted 703, an optional test 704 may be performed to verify the adjustments. This may involve, for example, writing a known pattern at sectors using the selected timing and/or laser boost adjustments and measuring transition position shift upon reading back the data. If significant errors or non-convergence is seen, then the timing window may be adjusted 705 further, e.g., increased or decreased as appropriate. While not shown, additional adjustments to laser boost may be made instead of or in addition to the adjustment 705 of the timing.

Figure 8:
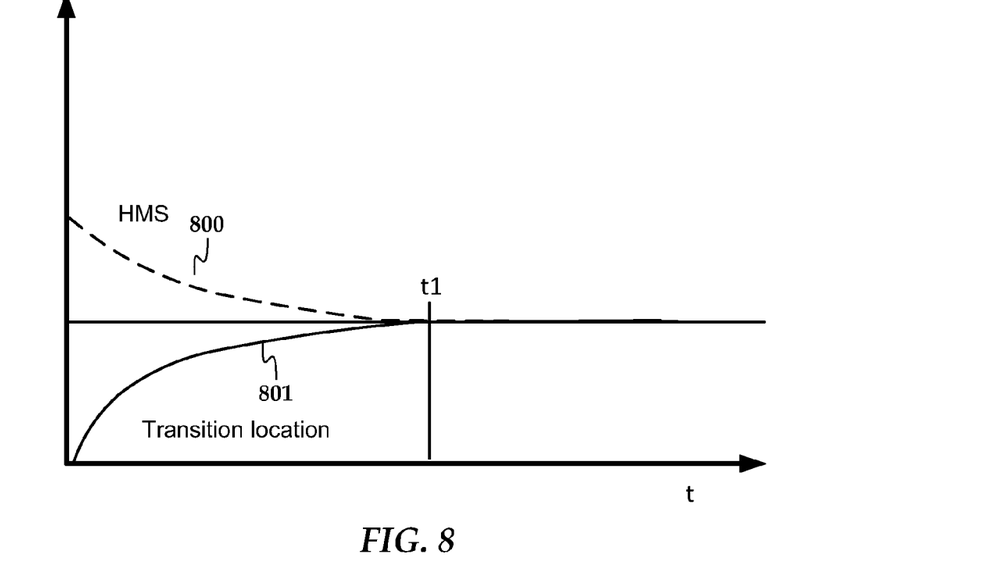
FIGS. 8-10 are graphs illustrating effects of head media spacing and laser boost on transition location according to an example embodiment.
Figure 9:
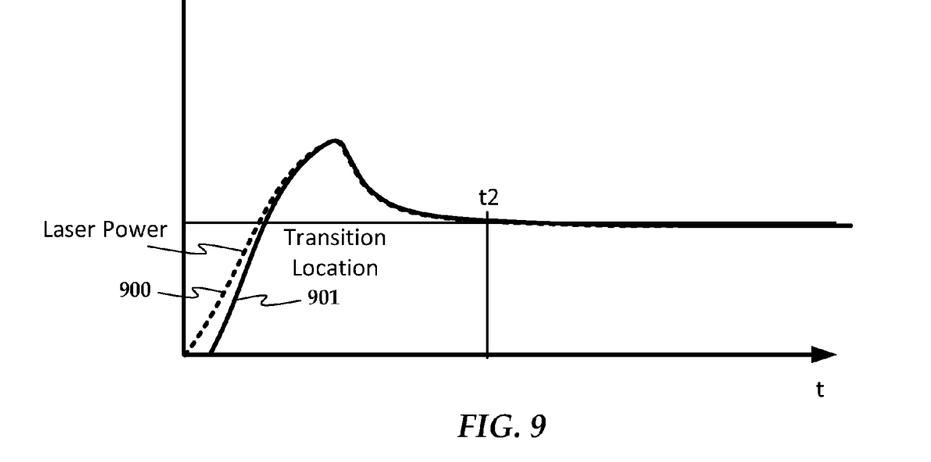
Figure 10:
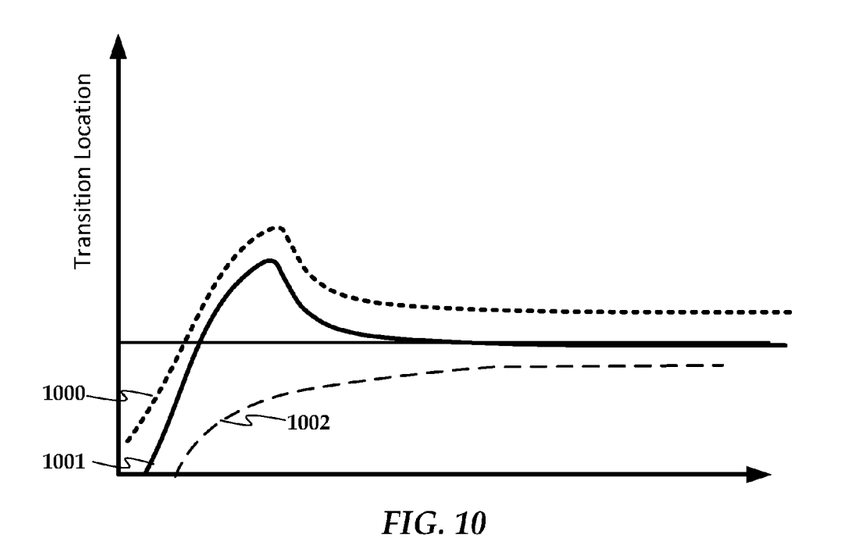

In FIGS. 8-10, graphs illustrate how various parameters may affect transition position according to an example embodiment. In FIG. 8, curve 800 represents a nominal (e.g., non-HAMR) HMS response over time, and curve 801 represents transition location relative to a fixed point on the read/write head (e.g., location 510 as shown in FIG. 5, which is measured relative to the NFT). The HMS 800 approaches equilibrium at time t1, as does the transition location 801. Before time t1, the transition location is smaller (e.g., closer to the NFT) due to the increased HMS lowering coupling efficiency.

In FIG. 9, curve 900 represents a boosted laser current power response over time, and curve 901 represents resulting changes in transition location. In this case, the transition location curve 901 follows the general shape of the laser power curve 900, lagging slightly due to LIWP time constants, and both reaching equilibrium at about the same time t2. For different laser diode designs and/or vendors, the rise time of the laser and rate of LIWP may be substantially different, resulting transition position changes when beginning write operations, e.g., writing the preamble. If the preamble length is small, the head may not reach target HMS, resulting in BER degradation in data sectors.

In FIG. 10, curves 1000-1002 represent combined effect of HMS and laser power shift on transition position. Depending on a time constant of the head and laser diode, the transition location may follow one of the curves. Curve 1000 represents an increased transition position, and may also correspond to an overly large cross-track dimension of the bits. Curve 1002, represents a decreased transition, and may correspond to an overly small cross-track dimension. Note that neither curve 1000 or 1002 approach a desired steady state value, which may result in phase lock errors during read back. While curve 1001 shows a peak in transition location commensurate with laser boost at the beginning of writing, it settles to the desired transition location.

Figure 11:
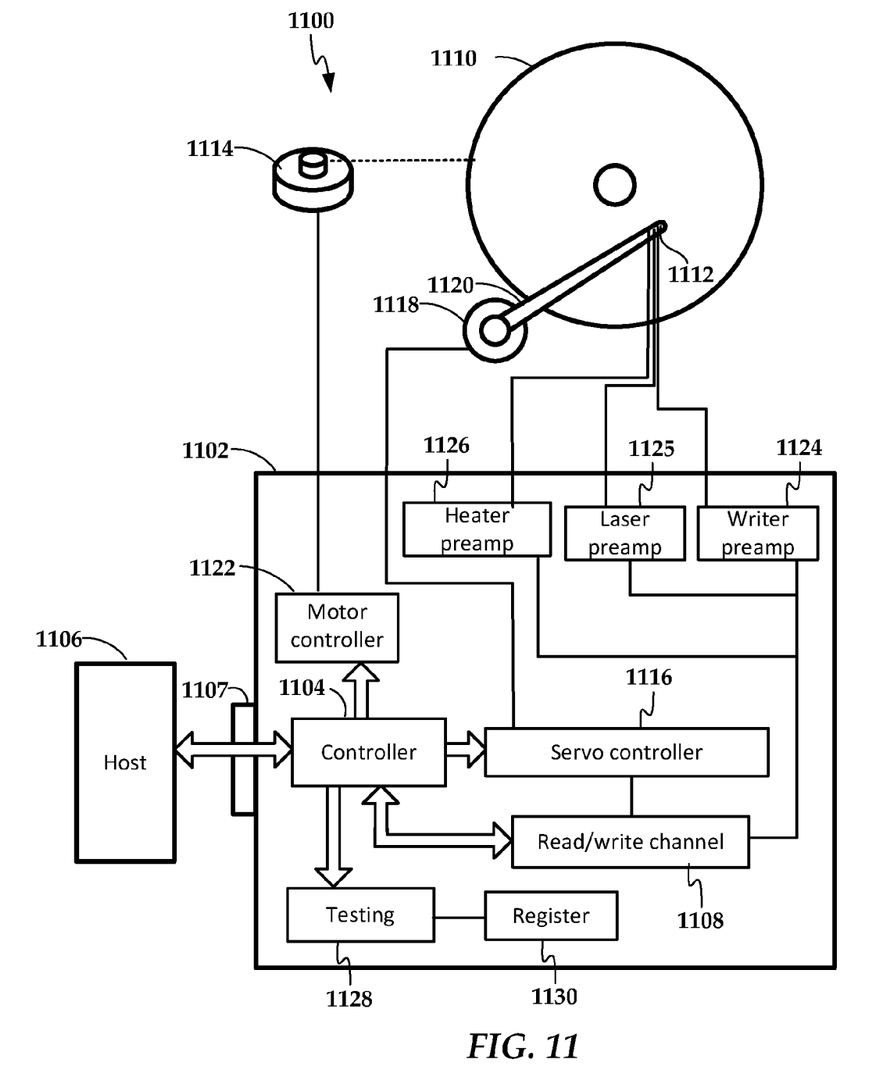
FIG. 11 is a block diagram of a system according to an example embodiment.

In reference now to FIG. 11, a block diagram illustrates components of a hard drive apparatus 1100 according to an example embodiment. The apparatus 1100 includes circuitry 1102 that is coupled to electromechanical components and electromagnetic sensors and transducers. The circuitry 1102 includes a controller 1104 that controls a number of functions of the apparatus 1100, including communications between the apparatus 1100 and a host device 1106 via a host interface 1107. The controller 1104 may include any combination of custom logic circuits, application specific integrated circuits (ASICs), general-purpose central processing unit (CPU), and may utilize instructions stored as firmware and/or software.

The host device 1106 may include any electronic device that can be communicatively coupled to store and retrieve data from an HDD, e.g., a general-purpose computer. The controller 1104 may carry out write commands by formatting the associated data into sectors with the appropriate header information, and transferring the formatted data via a read/write channel 1108 to the data storage surface of a disk 1110. The controller 1104 may provide analogous functions for read commands, e.g., determining the location of the desired data, moving the heads to the location (track) of the data, reading the data from the disk 1110 via the read/write channel, correcting any errors and formatting the data for the host 1106, etc.

The read/write channel 1108 converts data between the digital signals processed by the data controller 1104 and the analog signals conducted through read/write heads 1112. The read/write channel 1108 also provides servo data read from the disk 1110 to a servo controller 1116. The servo controller 1116 uses these signals to drive an actuator 1118 (e.g., voice coil motor) that rotates an arm 1120, upon which the read/write heads 1112 are mounted. The heads 1112 are moved radially across different tracks of the disk(s) 1110 by the actuator motor 1118 (e.g., voice coil motor), while a spindle motor 1114 rotates the disk(s) 1110. A microactuator (not shown) may also be included to provide finer tracking control. The data controller 1104 controls the spindle motor 1114 by way of a motor controller 1122.

The read/write channel 1108 provides analog write signals that are delivered to the write head 1112 by way of a write preamp 1124. The write preamp 1124 amplifies and conditions the write signals so that magnetic fields generated at the write head 1112 are of a duration and magnitude that results in efficient storage of data on the magnetic surfaces of the disk 1110. For example, the preamp 1124 may condition the write signal to account for load characteristics (e.g., resistance, capacitance, inductance) of the signal path that couples the write head 1112 to the preamp 1124, and for characteristics of the write head 1112 itself.

In the illustrated embodiment, a laser preamplifier 1125 energizes a laser (or other energy source) at the write head 1112 during write operations. The laser preamplifier 1125 conditions the signals to ensure the laser provides sufficient energy to heat a spot on the disk 1110 as it is being recorded. The laser preamplifier 1125 may responds to signals from the read/write channel 1108 (or servo controller 1116) that indicate when to activate and deactivate the laser, as well as setting the amount of laser power to apply.

A heater preamp 1126 provides current to an actuator on the write head 1112, such as one or more resistive heaters. The current can be varied to maintain a desired spacing between the write head 1112 and the disk 1110. The heater preamp 1127 may respond to signals from the read/write channel 1108 (or servo controller 1116) that cause an HMS to be maintained appropriate for a current operation, e.g., read, write, seek, etc. It will be understood that more than one heater preamp may be used, e.g., one for a read heater and one for a write heater.

A testing module 1128 is operable by the controller to perform operations as described previously herein. Generally, the testing module 1128 may operate during a design or manufacturing phase of the apparatus 1100 to measure a time constant of a head-to-media spacing of a write head, as well as thermal response to laser output power. This testing may determine one or more write parameters that are stored in a register 1130 and used read/write channel and servo controller 1116 when synchronizing to the start of data sectors. For example, the servo controller 1116 reads timing signals from servo marks on the disk 1110, and time/phase of bit transitions of preambles and/or data sectors written via the writer preamplifier 1124 may be adjusted based on the parameters. The write parameter may also include an amount and/or timing of laser power boost used by the laser preamplifier 1125 beginning of writing a data sector. The write parameter ensures data written by the write head 1112 can be read back with accurate phase lock. The functionality of testing module 1128 may be partially or fully provided by way of the host 1106. For example, the host 1106 may be configured as an engineering test system or a qualification test system that performs the indicated testing of thermal response and/or write parameters. Such testing system includes a processor, memory, and input/output circuitry as is known in the art.

Figure 12:
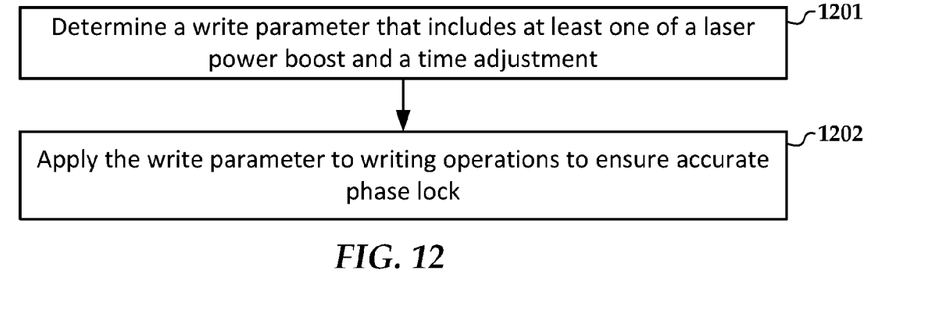
FIGS. 12 and 13 are flowcharts illustrating procedures according to example embodiments.

In FIG. 12, a flowchart illustrates a method according to an example embodiment. The method involves determining 1201 a write parameter, the write parameter including at least one of a laser power boost at a beginning of writing and a time adjustment affecting the beginning of the writing. The write parameter is determined based on time constant, and may be determined before or during manufacture of storage devices using the series of the write head. The time constant may be characteristic of a particular (e.g., individual) write head, or collection of write heads used in a drive and may be determined in manufacturer/testing of the drive. The thermal time constant may be characteristic of a combination of components used in a series of write heads and/or data storage devices (e.g., write coil, laser, preamplifiers).

The thermal time constant may be determined directly, e.g., via measuring HMS for a range of input variables, including laser boost, write coil power, heater power, write signal and/or heater signal parameters (e.g., rise time, delay, overshoot). The thermal time constant may be instead or in addition be determined indirectly, e.g., via effects caused by changing of write parameters as discussed below. The write parameter is applied 1202 to writing operations affecting a heat-assisted magnetic recording medium. The write parameter ensures accurate phase lock during reading operations directed to the heat-assisted magnetic recording medium.

Figure 13:
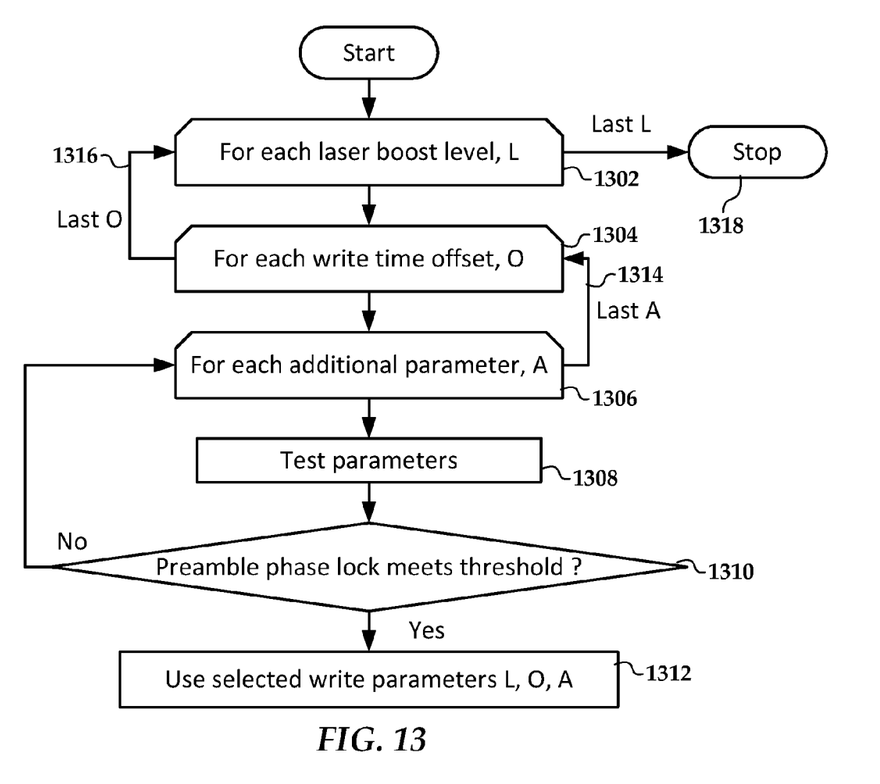

As noted above, the thermal time constant of a write head's HMS response may vary based on a number of factors, and therefore write parameters may be specifically adjusted to provide the desired phase lock. These parameters may be set for a particular combination of parts, and then applied as firmware settings to the manufactured devices. In some cases, there may be sufficient variation between individual parts of the same design and/or manufacture that further adjustment to the parameters may be needed for individual drives, e.g., ones that fail qualification testing. In FIG. 13, a flowchart shows an example of how such parameters may be tested by sweeping through ranges of the parameters to determine an acceptable level of phase lock accuracy/convergence. Some variation on the procedure may be performed on an engineering prototype hard disk drive and/or may be performed on each read/write head in each hard disk device.

Generally, the procedure in FIG. 13 involves iterating through loops indicated by blocks 1302, 1304, 1306. In block 1302, a laser boost level is selected from a set of possible boost levels, e.g., specified as a digital input to a preamplifier. Similarly, a write time offset O is selected from a set of possible offsets at block 1304. The additional factor A at block 1306 may include a number of different parameters (or none), and block 1306 may be optional or include more than one loop. Examples of parameters A include signal parameters (e.g., average magnitude, rise time, fall time, delay, DC offset, etc.) of a signal applied to a write coil and/or to a heater. Other examples of the parameters A may include preamble length.

A test 1308 is performed using a selected set of L, O, and (optionally) A. The test 1308 may at least involving writing data sectors and determining ease/accuracy of achieving phase lock on preambles of the data sectors. If the preamble phase lock meets a threshold as determined at block 1312, then the currently selected parameters are used 1312 in one or more hard disk drives, e.g., as a default set of parameters for a series of hard disk drives, or for individual drives.

Generally, the threshold determined at block 1310 may be dependent on at which stage the procedure is being performed. For example, for pre-manufacture testing, there may be more time to test a large combination of parameters, and so a global optimum may be tested for. For a qualification test of a particular drive, where time may be more of an issue, a threshold metric of effectiveness (e.g., error rate, time to converge) may be sufficient to allow the test to complete.

As illustrated, loop 1306 is repeated for all values of A, and if the result of block 1310 is "no" for all values of A, control passes via line 1314 to block 1304, where the next value of O is selected. Similarly, if the last value of O is reached without exiting via block 1310, then control passes via line 1316 to block 1302, where the next value of L is selected. If the threshold is never reached, then the procedure exits via block 1318.

It will be understood there may be many variations on the procedure illustrated in FIG. 13. For example, a smaller number of parameters L, O, and A may be used (e.g., just one of L, O, and A; a combination of two, etc.). Similarly, the size of sets from which L, O, and A are selected may be smaller for qualification testing of individual drives. Reducing the test set for individual drive testing to save time and reduce complexity of the drive controller, while still allowing for final adjustment of shipping devices that may vary slightly due to manufacturing tolerances. The order of iterations may also be changed from what is shown. For example, if preamble length is included as part of optional parameters A, then the preamble length may be set to a small value at an outer loop, and then increased for subsequent loops if desired phase lock performance is not met.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining, based on a thermal time constant of a head-to-media spacing of a write head, a write parameter that includes at least one of: a modified laser power boost used at a beginning of writing to a heat-assisted magnetic recording medium; and a time adjustment affecting the beginning of the writing; and
   applying the write parameter to writing operations affecting the heat-assisted magnetic recording medium, the write parameter ensuring accurate phase lock during reading of the heat-assisted magnetic recording medium.

2. The method of claim 1, wherein the thermal time constant is characteristic of a combination of components used in a series of write heads, the write parameter being determined before or during manufacture of storage devices using the series of the write head.

3. The method of claim 1, wherein the thermal time constant is characteristic of a particular write head.

4. The method of claim 3, wherein the write parameter is determined during manufacture of a storage device using the particular write head.

5. The method of claim 3, wherein the write parameter is stored in a memory of a storage device and retrieved from the memory for use with the particular write head.

6. The method of claim 3, further comprising:
   writing a known pattern to data sectors of the heat-assisted magnetic recording medium using the write parameter; and
   in response to detecting a transition position shift or non-convergence when reading back the data sectors, changing the preamble length, and adjusting the write parameter to include the increased preamble length.

7. The method of claim 1, wherein the write parameter compensates for variation in cross track bit size that affects a transition location that defines bit boundaries at the beginning of the writing.

8. The method of claim 1, wherein the modified laser power boost comprises at least one of different magnitude and start time than a nominal laser boost value.

9. The method of claim 1, wherein the modified laser power boost compensates for a variation in rise time of a laser used with the write head.

10. An apparatus, comprising:
    a laser preamplifier that delivers power to a laser of a write head;
    a write preamplifier that energizes a write coil of the write head, the write coil and the laser together writing data to a heat-assisted magnetic recording medium; and
    a controller coupled to the laser preamplifier and the write preamplifier, the controller configured to perform:
       iterating through a set of write parameters that each include at least one of: a modified laser power boost used at a beginning of writing; and a time adjustment affecting the beginning of the writing;
       determining a selected one of the set of write parameters that provides a threshold level of phase lock during reading operations; and
       applying the write parameter to writing operations affecting the heat-assisted magnetic recording medium.

11. The apparatus of claim 10, further comprising a memory where the write parameter is stored, the controller retrieving the write parameter from the memory for use with the write head when writing user data.

12. The apparatus of claim 10, wherein the write parameter compensates for variation in cross track bit size that affects a transition location that defines bit boundaries at the beginning of the writing.

13. The apparatus of claim 10, wherein the modified laser power boost comprises at least one of different magnitude and start time than a nominal laser boost value.

14. The apparatus of claim 10, wherein the modified laser power boost compensates for a variation in rise time of the laser.

15. A test system, comprising:
    input/output circuitry configured to be coupled to a hard disk drive, the hard disk drive comprising a write head with a laser and configured to write to a heat-assisted magnetic recording medium; and
    a processor coupled to the input output circuitry and configured to perform:
       determining, based on a thermal time constant of a head-to-media spacing of a write head, a write parameter that includes at least one of a modified laser power boost used at a beginning of writing, and a preamble length before the beginning of the writing, the write parameter being applied to writing operations of the hard disk drive or similar hard disk drives, the write parameter ensuring accurate phase lock during reading operations.

16. The test system of claim 15, wherein the write parameter compensates for variation in cross track bit size that affects a transition location, the transition location defining bit boundaries at the beginning of the writing.

17. The test system of claim 15, wherein the modified laser power boost comprises at least one of different magnitude and start time than a nominal laser boost value.

18. The test system of claim 15, wherein the thermal time constant is characteristic of a combination of components used in the write head.

19. The test system of claim 15, wherein the thermal time constant is particular to the write head of the hard disk drive.

20. The test system of claim 15, wherein the write parameter is determined before manufacture of the other hard disk drives.

* * * * *